(12) United States Patent
Myers et al.

(10) Patent No.: US 11,714,564 B2
(45) Date of Patent: Aug. 1, 2023

(54) SYSTEMS AND METHODS OF POWER MANAGEMENT

(71) Applicant: Arm Limited, Cambridge (GB)

(72) Inventors: James Edward Myers, Bottisham (GB); Pranay Prabhat, Cambridge (GB); Matthew James Walker, Cambridge (GB); Parameshwarappa Anand Kumar Savanth, Cambridge (GB); Fernando Garcia Redondo, Cambridge (GB)

(73) Assignee: Arm Limited, Cambridge (GB)

( * ) Notice: Subject to any disclaimer, the term of this patent is extended or adjusted under 35 U.S.C. 154(b) by 262 days.

(21) Appl. No.: 16/735,606

(22) Filed: Jan. 6, 2020

(65) Prior Publication Data

US 2021/0208803 A1 Jul. 8, 2021

(51) Int. Cl.
*G06F 1/00* (2006.01)
*G06F 3/06* (2006.01)
*G06F 1/3234* (2019.01)
*G06F 1/324* (2019.01)
*G06F 1/3296* (2019.01)
(Continued)

(52) U.S. Cl.
CPC ............ *G06F 3/0634* (2013.01); *G06F 1/324* (2013.01); *G06F 1/3234* (2013.01); *G06F 1/3296* (2013.01); *G06F 3/0625* (2013.01); *G06F 1/3209* (2013.01); *G06F 1/3221* (2013.01); *G06F 3/0689* (2013.01)

(58) Field of Classification Search
CPC .... G06F 3/0634; G06F 1/3234; G06F 1/3224; G06F 1/3296; G06F 1/3221
See application file for complete search history.

(56) References Cited

U.S. PATENT DOCUMENTS 9,110,671 B2 * 8/2015 Eckert ................... G06F 1/3296
10,678,964 B2 * 6/2020 Kawai ..................... G06F 30/20
(Continued)

OTHER PUBLICATIONS

PCT International Search Report and Written Opinion; PCT/GB2020/053262; dated Mar. 11, 2021.
(Continued)

*Primary Examiner* — Mohammed H Rehman
(74) *Attorney, Agent, or Firm* — Pramudji Law Group PLLC; Ari Pramudji

(57) ABSTRACT

According to one implementation of the present disclosure, a method for power management is disclosed. The method includes: computing, by a central processing unit, software instructions of a software workload in an active-mode operation corresponding to a first operating point on a performance curve of a performance mode; transitioning from instances of the active-mode operation to instances of standby-mode operation of the CPU, and recording, by a time tracking element, each of a plurality of standby entry data points; transitioning from the instances of the standby-mode operation to the instances of the active-mode operation of the CPU, and recording, by the time tracking element, each of a plurality of standby exit data points; and determining a second operating point on the performance curve of the performance mode based on the recorded standby entry data points and the recorded standby exit data points.

24 Claims, 6 Drawing Sheets

(51) Int. Cl.
*G06F 1/3209* (2019.01)
*G06F 1/3221* (2019.01)

(56) References Cited

U.S. PATENT DOCUMENTS

| | | | |
|---|---|---|---|
| 2003/0105983 A1* | 6/2003 | Brakmo | G06F 1/3262 |
| | | | 713/320 |
| 2004/0039954 A1 | 2/2004 | White et al. | |
| 2004/0123297 A1 | 6/2004 | Flautner et al. | |
| 2005/0066330 A1 | 3/2005 | Kanai et al. | |
| 2006/0156306 A1* | 7/2006 | Di Gregorio | G06F 9/4881 |
| | | | 718/102 |
| 2008/0222632 A1* | 9/2008 | Ueno | G06F 11/3423 |
| | | | 718/1 |
| 2009/0048804 A1* | 2/2009 | Gary | G06F 1/3203 |
| | | | 377/16 |
| 2010/0244573 A1* | 9/2010 | Karnick | H02J 7/34 |
| | | | 307/80 |
| 2010/0287396 A1 | 11/2010 | Barth et al. | |
| 2012/0239956 A1 | 9/2012 | Kwon et al. | |
| 2013/0179711 A1 | 7/2013 | Aelion et al. | |
| 2014/0229720 A1* | 8/2014 | Hickey | G06F 1/324 |
| | | | 712/240 |
| 2017/0115723 A1* | 4/2017 | Shurin | G06F 1/3268 |
| 2019/0362764 A1* | 11/2019 | Qawami | G11C 29/022 |

OTHER PUBLICATIONS

Pillai, et al.; Real-Time Dynamic Voltage Scaling for Low-Power Embedded Operating Systems; ACM SIGOPS Operating Systems Review; vol. 35, Issue 5; pp. 89-102; Dec. 2001. https://doi.org/10.1145/502059.502044.

\* cited by examiner

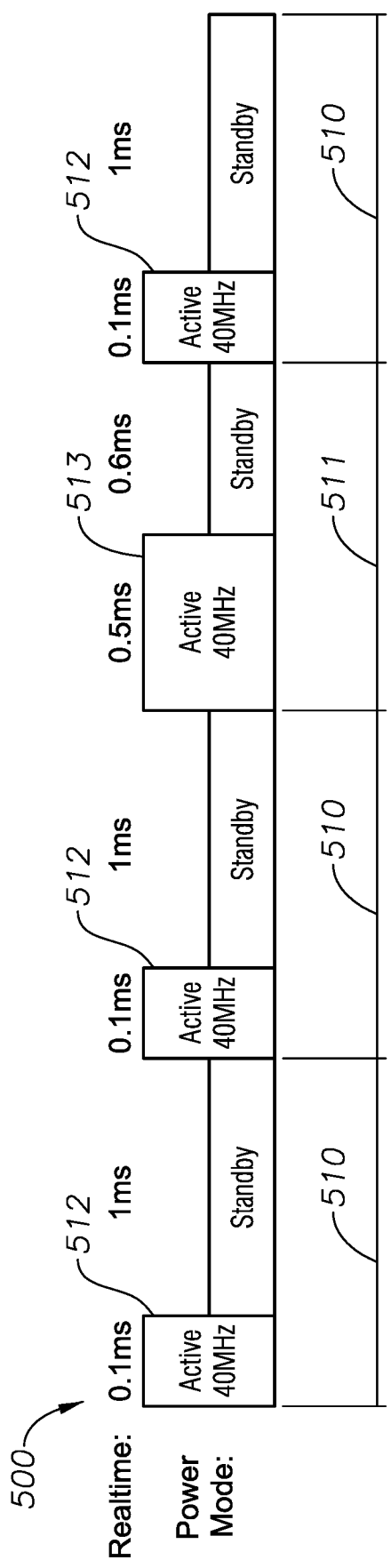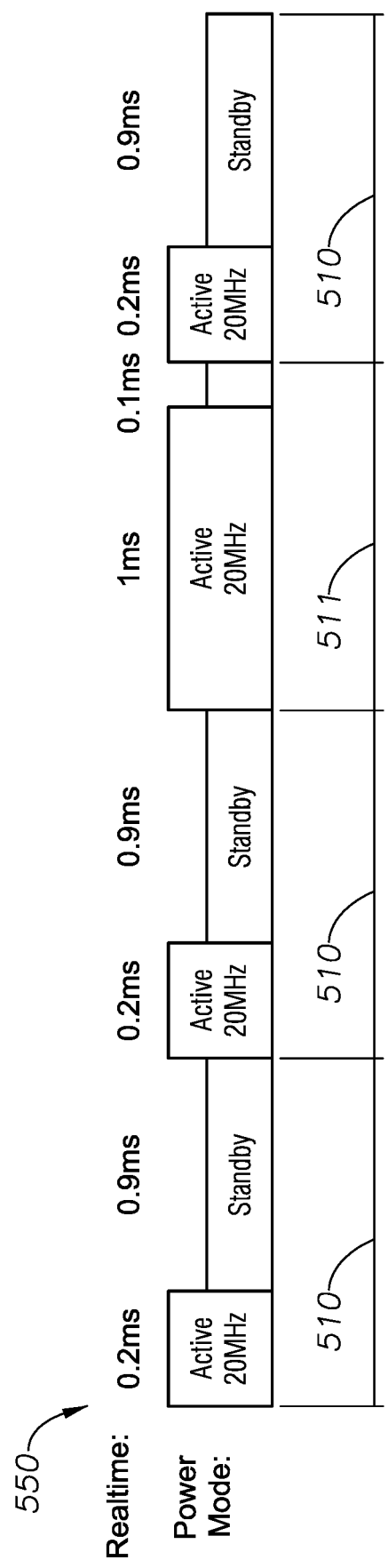
FIG. 5A
FIG. 5B

SYSTEMS AND METHODS OF POWER MANAGEMENT

STATEMENT REGARDING FEDERALLY SPONSORED RESEARCH OR DEVELOPMENT

This invention was made with Government support under Agreement No. HR0011-17 9-0025, awarded by DARPA. The Government has certain rights in the invention.

FIELD

The present disclosure is generally related to systems and methods for power management.

DESCRIPTION OF RELATED ART

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

In mobile/desktop application processors, where management is performed by the operating system, dynamic voltage frequency scaling (DVFS) has been utilized to optimize dynamic power consumption. In operation, DVFS is a technique to reduce power consumption by dynamically adjusting voltage and frequency of a computer processing unit (CPU), by taking advantage of the CPU's discrete frequency and voltage settings. However, such a DVFS technique has yet to be widely adopted for embedded microcontroller units (MCUs) despite energy constraints arising from small battery operation.

Instead, one power management approach implemented for MCUs includes power gating (either with or without local state retention). Currently, power gating has be utilized to reduce leakage power while MCUs are in standby-mode. Also, with reference to Cortex-M systems, entry into such low leakage modes may require initiation by wait-for-interrupt (WFI) instruction.

However, as MCUs are tasked with operation of ever-increasing intensity or "always-on" activities (e.g., voice detection), employing efficient active power management is of significant importance. Accordingly, there is a need in the art for more optimal active power management. Furthermore, one particular challenge in employing DVFS for MCU power management is in determining when to run each frequency on a DVFS performance curve. While such consideration can be performed by a software developer, independently, a comprehensive hardware-based solution has yet to be developed.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems or apparatuses described herein.

FIGS. 5A-5B illustrate an example diagram in accordance with implementations of various techniques described herein.

Figure 1:
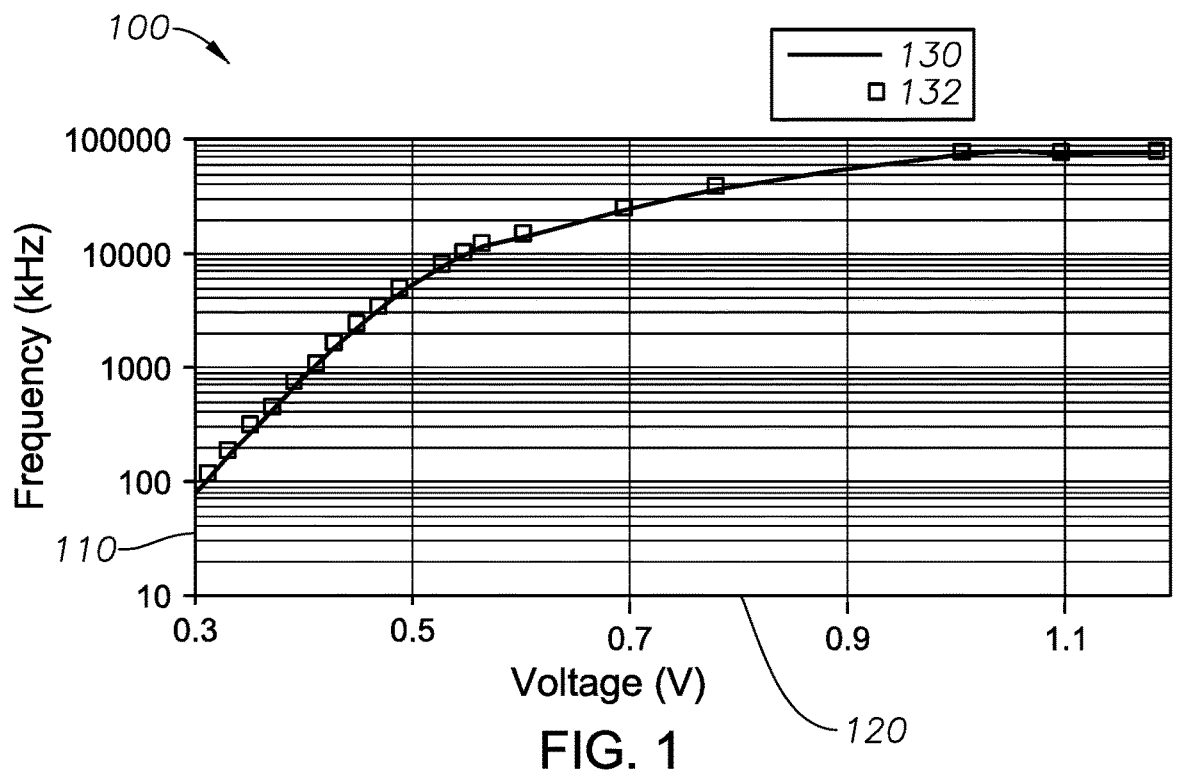
FIG. 1 illustrates a graphical representation in accordance with implementations of various techniques described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

According to one implementation of the present disclosure, a method for power management is disclosed. The method includes: computing, by a central processing unit, software instructions of a software workload in an active-mode operation corresponding to a first operating point on a performance curve of a performance mode; transitioning from instances of the active-mode operation to instances of standby-mode operation of the CPU, and recording, by a time tracking element, each of a plurality of standby entry data points; transitioning from the instances of the standby-mode operation to the instances of the active-mode operation of the CPU, and recording, by the time tracking element, each of a plurality of standby exit data points; and determining a second operating point on the performance curve of the performance mode based on the recorded standby entry data points and the recorded standby exit data points.

According to another implementation of the present disclosure, a system is disclosed. The system includes: a central processor unit (CPU), a power management unit (PMU) coupled to the CPU, and a time tracking element coupled to the CPU and the PMU. The PMU may be configured to control the time tracking element to record standby entry and exit data points of one or more code phases of a software workload. Also, the CPU may be configured to determine an operating point on a performance curve based on the recorded standby entry and exit data points.

According to another implementation of the present disclosure, a method is disclosed. The method includes: sampling, by a microcontroller device of a power management unit (PMU), standby time values of a software workload upon power-mode changes; and determining a performance mode corresponding to a particular operating point on a performance curve based on the sampled standby values.

According to one implementation of the present disclosure, a method for power management is disclosed. The method includes; computing, by a central processing unit, software instructions of a software workload in an active-mode operation corresponding to a first operating point on a performance curve of a performance mode; transitioning from instances of the active-mode operation to instances of standby-mode operation of the CPU; transitioning from the instances of the standby-mode operation to the instances of the active-mode operation of the CPU; and determining a second operating point on the performance curve of the performance mode based on at least a portion of a plurality of standby entry data points and at least a portion of a plurality of standby exit data points. Also, the plurality of standby entry data points may correspond to the transitions from the active-mode operation to the standby-mode operation, and the plurality of standby exit data points may correspond to the transitions from the standby-mode operation to the active-mode operation.

According to another implementation of the present disclosure, a computer system is disclosed. The computer system includes a computer processor unit (CPU) and a memory accessible to the CPU. The memory may store instructions that are executable by the CPU to perform operations including: providing for a time tracking element to sample standby time values of a software workload upon power-mode changes; storing the sampled standby time values into a programmable memory; and modifying subsequent standby time values based on the stored standby time values.

Particular implementations of the present disclosure are described below with reference to the drawings. In the description, common features are designated by common reference numbers throughout the drawings.

In exemplary aspects, systems and methods of the present disclosure provide runtime power management to optimize real-time power performance. Advantageously, in certain implementations, based on standby-tracking features, the systems and methods may automatically "adjust" (i.e., update, shift) an operating point of a particular performance mode (e.g., DVFS mode configuration). Moreover, upon adjusting the operating point, systems and methods, as described herein, may automatically enact an "optimized" performance mode for either single phase or multi-phase software workloads. Accordingly, for instance, upon "learning" (through data point aggregation) that active-power operation may be run for a longer time interval at a lower power level, the systems and computer-implemented methods would be directed to do so. As a further advantage, the systems and methods may be implementable for embedded microcontrollers (e.g., "always-on" power controllers) as well as other alternative operating system managed computer systems.

Advantageously, whether it be through computer-implemented software (in a central processing unit (CPU)) or through hardware (in a power management unit (PMU)), the systems (and according to the inventive methods) of the present disclosure may monitor (i.e., check) and record the data values in real-time when the embedded microcontroller (or other managed computer system) enters sleep-mode or "wakes-up" from sleep-mode. In doing so, according to one example, over an established time period, the inventive systems would gain "confidence" that because active power has not deviated from a current pattern (that would have a sufficient surplus standby time), a determination may be made that a particular software workload can, therefore, be run at slower pattern at a lower voltage level.

In certain implementations, as described herein, DVFS, as one performance mode, may be used to take advantage of the relationship between speed and power consumption as a function of power supply voltage. For instance, the speed of CMOS logic may be proportional to the power supply voltage and the power consumption of the CMOS logic may be proportional to the square of the power supply voltage ($V^2$). Hence, by reducing the power supply voltage to an example minimum level that can provide the required performance, power consumption can be significantly reduced.

Referring to FIG. 1, an example power management performance graph/map 100 is shown. As depicted, the power management performance map 100 (i.e. graph 100) includes a range of frequencies (kHz) (from approximately 10 to 100,000) on the Y-axis 110 as a function of a range of voltages (V) (from approximately 0.3-1.1) on the X-axis 120. In one example, as shown in FIG. 1, a range of prospective operating points 132 (i.e., a plurality of operating points) form a performance curve 130 (i.e., a performance spectrum) on the performance map 100. In various implementations, the performance curve 130 may represent different performance points for a particular power consumption mode of a computer system (e.g., an embedded microcontroller). In a first example, with reference to FIG. 1, the performance curve 130 may correspond to a dynamic voltage and frequency scaling (DVFS) mode (e.g., a first performance mode). In a second example (not shown), the performance curve may correspond to a mode of body-biasing for frequency scaling at ISO-voltage (e.g., a second performance mode). In the second example, the power management performance map 100 would include a range of frequencies (kHz) on the Y-axis as a function of a range of body-biasing on the X-axis. Hence, in this manner, for various performance modes, reductions in operating frequency would prompt the determination of a new performance operating point. Correspondingly, in certain schemes, the systems and methods may also be utilized to decide when to run each particular frequency on a particular performance curve (e.g., a DVFS performance curve).

Figure 2:
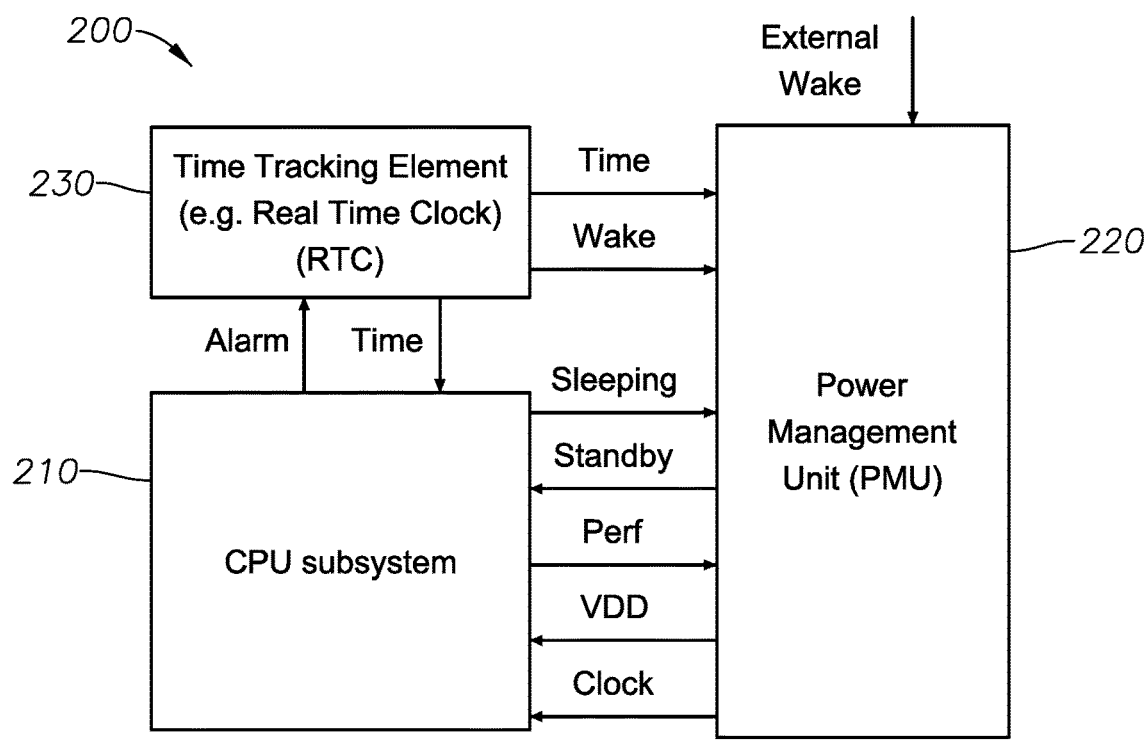
FIG. 2 illustrates a block diagram of a system in accordance with implementations of various techniques described herein.

Referring to FIG. 2, an example system 200 is shown. The system 200 (e.g., a computer system) includes a central processor unit (e.g., CPU, CPU subsystem) 210, a power management unit (PMU) 220, and a time tracking element 230 (e.g., a standby tracking device such a real-time clock (RTC)). The CPU 210, the PMU 220, and the time tracking element 230 may be electrically coupled to one another. In certain implementations, the PMU 220 may be configured to control the time tracking element 230 to record standby entry and exit data points (i.e., statistics, metrics) of one or more code phases of a software workload. Also, the CPU 220 may be configured to determine an operating point of a particular performance mode (e.g., an operating point 132 of a dynamic voltage frequency scaling (DVFS) curve 130) based on the recorded standby entry and exit data points.

In one implementation, a code phase may include a particular duty cycle (e.g., one instance each of active-mode (i.e., active-power mode, active-phase) and one instance of standby-mode operations (i.e., standby-power mode, standby-phase) of a software workload. In another implementation, a code phase may include a plurality of the same active-phase and standby-phase for the software workload. In various scenarios, the software workload may either be a single software workload (e.g., as described with referenced to FIGS. 4A-B) or a multi-phase software workload (e.g., as described with reference to FIGS. 5A-B).

The PMU 220 may be a microcontroller (or include a microcontroller) to govern power functions of digital platforms. The PMU 220 may include firmware (to provide low-level control for hardware), software, memory, a processing subsystem, input/output functions, timers (to measure intervals of time), and analog to digital converters (to measure the voltages of the main battery or power source of the system 200). In certain aspects, the Milli 220 remain active even when the system 200 may be completely shut down and can be powered by a backup battery.

In certain implementations, the PMU 220 may coordinate various functionality including: monitoring power connections and battery charges; charging batteries when required; controlling power to other integrated circuits; shutting down unnecessary system components when left idle; controlling sleep and power functions (e.g., on and off); and regulating the time tracking element 230 (e.g., real-time clock (RTC)).

In operation, specifically, the PMU 220 may be configured to: initialize software instructions of a particular software workload; sequence the CPU 210 into instances of standby-mode operation upon notification that the CPU 210 is "sleeping" (i.e., suspend, suspend to random-access memory (RAM), transitioned to standby-mode); and "wake-up" the CPU 210 upon activations of the time tracking element 230 (e.g., when the RTC raises an alarm).

Moreover, according to example processes, the PMU 220 may also be configured to provide an operating voltage (e.g., a low operating voltage) (i.e., a "lower" VDD) and a clock signal ("clock") to set an optimal DVFS mode, thus, enacting an optimize performance mode. In certain cases, the PMU 220 may be included inside a system on chip (SOC) and other cases, the PMU 220 may be included outside of a SOC.

In operation, the CPU 210 may be configured to: evaluate the recorded standby entry and exit data points based on standby periodicity and standby regularity. In doing so, in certain cases, the CPU 210 can be configured to compute a duty cycle and a minimum time interval for a particular standby-mode operation. Also, in such cases, the duty cycle may be a quotient of a weighted active time interval and a weighted standby time interval of a particular software workload.

In operation, specifically, the time tracking element 230 (e.g., standby tracking element) may be configured to track standby time intervals by one of a real-time clock (RTC), a voltage measurement device, resistor-capacitor (RC) time-constants, and leakage (time-remanence) measurement. In certain implementations, an alarm triggered by the time tracking element 230 (e.g., a real-time clock) may be configured ("programmed") to provide subsequent initiations of active-mode operation ("future wake-ups") of the CPU.

In certain aspects, transitions to the standby-mode operation may be performed in response to one of: a sleep-mode of the CPU 210 or a wait-for-interrupt (WFI) instruction. Also, in certain aspects, transitions to the active-mode operation are performed in response to one of: active-mode operation requests of the CPU 210, activations of an alarm of the time tracking element 230 (e.g., an RTC alarm), internal interrupt instructions, or external interrupt instructions.

In some implementations, the recording of standby entry data points and the recording standby exit data points may include: updating standby statistics, where updating standby statistics may include storing the recorded standby entry data points and recorded standby exit data points (i.e., resulting data) into a programmable memory (e.g., a non-volatile memory (NVM), a flip-flop, or a retentive static-random access memory (SRAM of the CPU 210 or the PMU 220.

Figure 3:
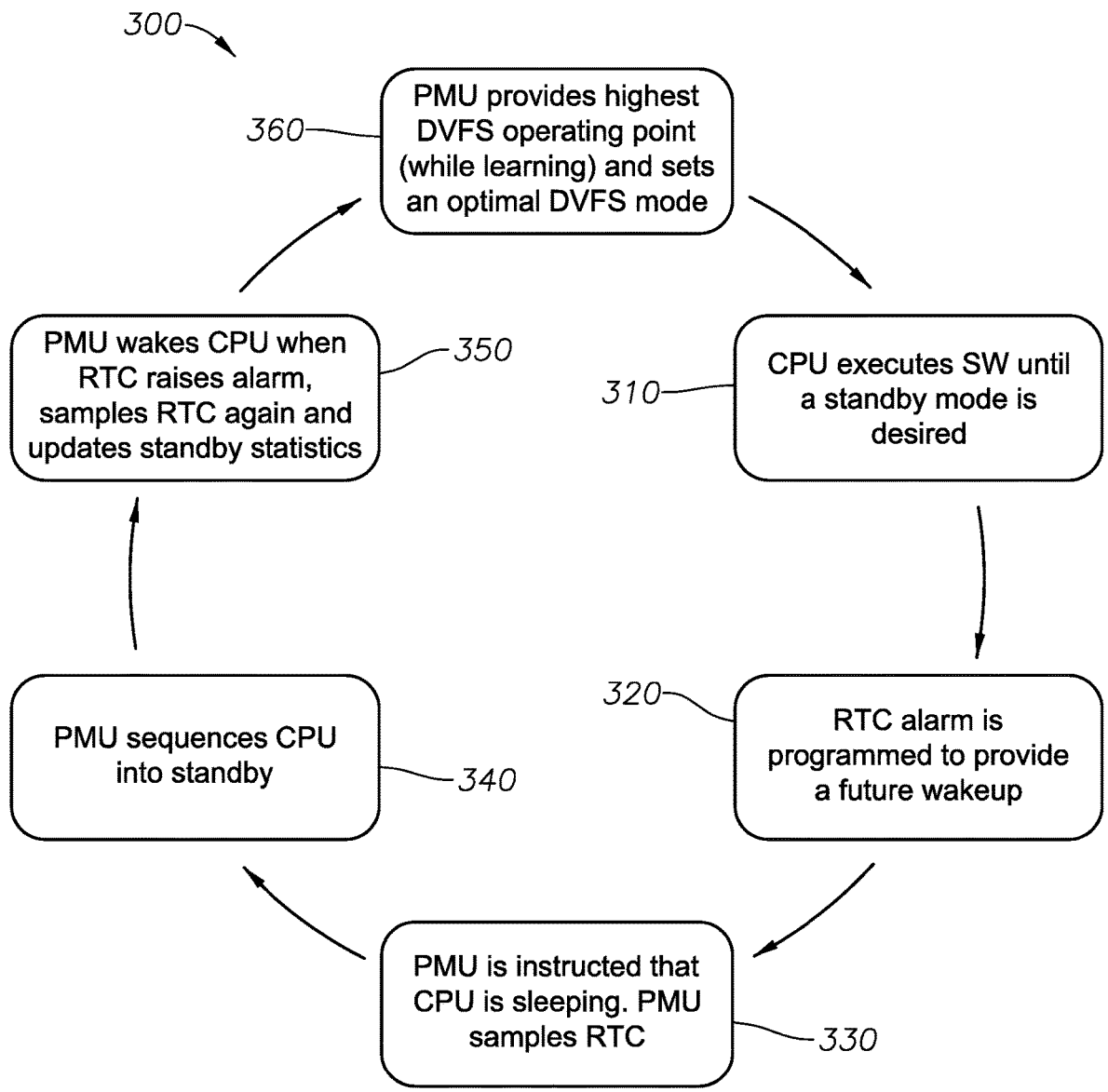
FIG. 3 illustrates a flowchart in accordance with implementations of various techniques described herein.

Referring to FIG. 3, an example power management process flowchart 300 implementable with the system 200 is shown. As illustrated, in one example operation, the power management process flowchart 300 is depicted as a "Smart" DVFS/standby cycle. At step 310, the CPU 210 may execute a software workload (SW) until a standby-mode (e.g., a fixed low power operation) is desired. At step 320, upon a standby-mode request, a time tracking element 230 (e.g., real-time clock (RTC) alarm) may be programmed to provide future CPU 210 "wake-ups" (i.e., transitions to active-mode operations). Next at step 330, upon receiving an instruction that the CPU 210 has in fact been transitioned to the standby-mode (i.e., "the CPU is sleeping"), the PMU 220 may initiate a "sampling" of the time tracking element 230 (e.g., RTC). In doing so, the PMU 220 may record each of the standby entry and exit data points (i.e., data metrics, data statistics) (e.g., "grabbing" of sensor data readings). In certain implementations, the standby entry and exit data points may be stored and aggregated in programmable memory (e.g., a non-volatile memory (NVM) or retentive SRAM) of the CPU 210 of the system 200. The "sampling" operation is further described with reference to FIG. 6. At step 340, the PMU 210 may be configured to sequence the CPU 210 into a standby-mode operation. In certain implementations, the sequencing of the CPU 210 may take into account a determined length of a particular standby-mode operation interval (e.g., in ms) and a determined active power (e.g., in MHz) and length of an active-mode operation interval (e.g., in ms). At step 350, upon the time tracking element 230 (e.g., RTC) raising the alarm, the PMU 220 would wake up the CPU 210, sample the time tracking element 230 (e.g., RTC) again, and update the standby entry and exit data points (i.e., standby statistics). Next, at step 360, the PMU 2020 would provide an updated operating point (e.g., the "highest" DVFS operating point (i.e., determining a "second" operating point) while "learning" (as described in the following paragraph) and would set an optimal DVFS mode (i.e., enacting the performance mode based on the second operating point). After step 360, the process 300 may continue back to step 310 and commence the procedure once again.

In some implementations, the second operating point may be determined by one or more of the following steps (in the next paragraph) to either: 1) reduce active performance (i.e., active power) to a minimum level for acceptable quality of service that would not delay the next "wake-up" event (i.e., transition to active-phase) or, alternatively, 2) increase active performance such that optimal performance may be realized. Hence, the second operating point may correspond to either an increase or decrease from the first operating point (with reference to the performance mode curve (e.g., performance mode curve 130) of a performance operating map (e.g., map 100), whereby increases (from the first operating point) would correspond to a lengthening of the active phase operation (i.e., active-mode operation), while decreases (from the first operating point) would correspond to a shortening of the active phase operation.

The steps may include: 1) evaluating the recorded standby evaluating the recorded standby entry data points and recorded standby exit data points (based on standby periodicity and standby regularity); 2) determining a cost (i.e., "performance or energy overhead" for changing a DVFS operating point (e.g., with reference to FIG. 6A-6B)) 3) power supply latency (i.e., direct current-to-direct current converter (DC-DC converter) (e.g., integrated voltage regulator (IVR) latency); 4) determining time intervals of the software workload (i.e., a "size" of the task interval), and/or 5) determining time intervals of transitions from the active-mode operation to the standby-mode operation, and vice-versa.

In one implementation, evaluating the recorded standby entry data points and recorded standby exit data points may further include computing a duty cycle and a minimum time interval for the standby-mode operation, where the duty cycle corresponds to a quotient of a weighted active time interval and a weighted standby time interval of the software workload.

Figure 4A:
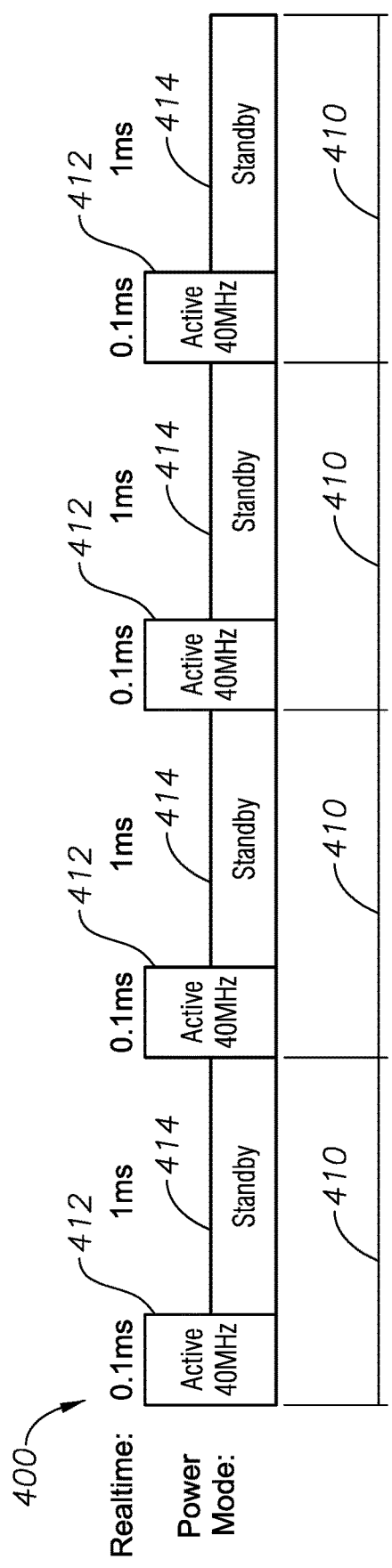
FIGS. 4A-4B illustrate an example diagram in accordance with implementations of various techniques described herein.
Figure 4B:
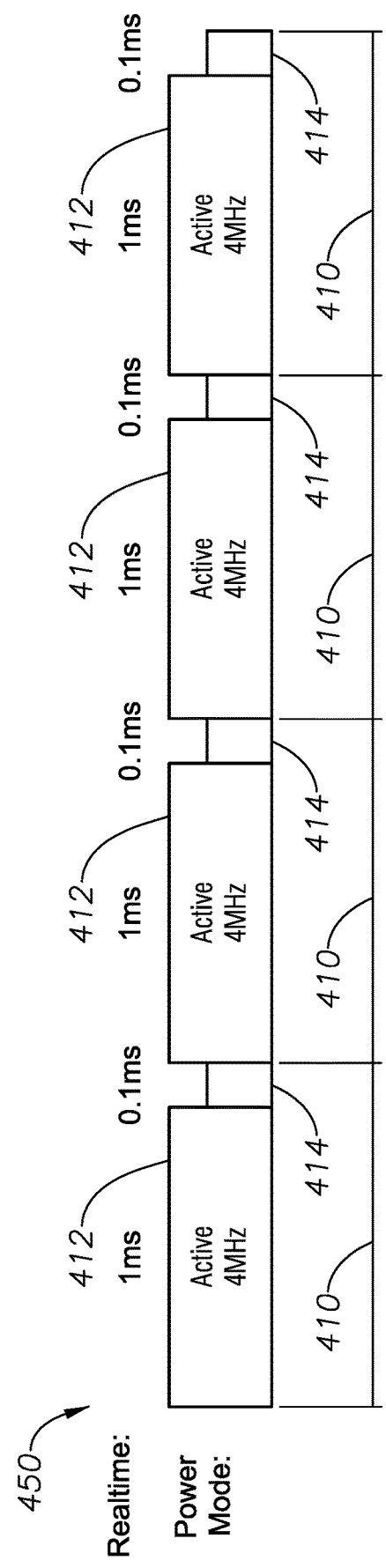

Referring to FIGS. 4A-4B, one example diagram of one or more code phases 410 is shown before (400 in FIG. 4A) and after (450 in FIG. 4B) active power management according to the inventive aspects. As illustrated, a power mode (e.g., active-mode 412 or standby-mode operations 414) (i.e., the execution of software instructions of a software workload) can be depicted over a period of time (i.e., milliseconds (ms)) for a particular sensing example. As shown, the example code phase 410 may represent a repetitive single task of a single phase (e.g., a software workload) that transitions from instances of active-mode operation 412 to instances of standby mode operation 414 (i.e., standby-phase) (e.g., a fixed low power operation) at fixed intervals.

As illustrated in FIG. 4A, prior to an active power management procedure (e.g., procedures 300, 700, with reference to FIGS. 2, 3, and 7), each of the active mode operations 412 (i.e., active phases), in one example, may be run at 40 MHz for a duration of 0.1 ms. In FIG. 4B, after the active power management procedure 400 (e.g., with reference to FIGS. 2, 3, and 7), the active mode operations 412 would be optimized (e.g., an operating point is adjusted/updated based on standby data point aggregation) such that each active phase 412 can be "stretched" into respective standby phases 414 (i.e., standby-mode operations). Hence, as shown in FIG. 4B, upon optimization, in the particular example, the active mode operations 412 may be run at 4 MHz over a longer duration. Thus, advantageously, by monitoring the active and standby times (e.g., recording and aggregating (storing) standby data points according to the example procedures 300, 700 as described herein including steps such as: "wakeup" at fixed intervals, "grabbing" sensor data readings, performing sanity checks, and storing/aggregating the sensor data readings) for a particular repetitive sensing task, an opportunity to run a clock operation nearly 90% slower, and reduce active energy by approximately 75% may be realized.

Advantageously, either through computer-implemented software (in a central processing unit (CPU)) or through hardware (in a power management unit (PMU)), the systems (and according to the inventive methods) of the present disclosure may record (i.e., sample) and aggregate the data values in real-time when the embedded microcontroller (or other managed computer system) enters sleep-mode or "wakes-up" from sleep-mode. In doing so, for example, over an established time period (e.g., an hour, a day), the inventive systems would gain "confidence" that because active power has not deviated from a current pattern (that would have a sufficient surplus standby time), a software workload can, therefore, be run at slower pattern at lower voltage level.

Referring to FIG. 5A-5B, one example of two or more different code phases 510, 511 is shown before (500 in FIG. 5A) and after (550 in FIG. 5B) active power management according to the inventive aspects. As illustrated, the power mode (e.g., active-mode operations 512, 513 or standby-mode operations 514, 515) (i.e., the execution of software instructions of two or more software workloads) can be depicted over a period of time (i.e., milliseconds (ms)) for a particular sensing example. The example codes phases 510, 511 may represent repetitive single tasks of multiple phases (i.e., multi-phases) (e.g., two or more software workloads) that transition from active-mode operations 512, 513 to standby mode operations 514, 515 (e.g., low power operations) at different intervals.

As illustrated in FIG. 5A, prior to an active power management procedure (e.g., procedures 300, 700 with reference to FIGS. 2, 3, and 7), the two or more active mode operations (e.g., first and second active-mode operations 512, 513), in one example, may be run at 40 MHz for durations of 0.1 ms and 0.5 ms, respectively. In FIG. 5B, after the active power management procedure (e.g., procedures 300, 700, with reference to FIGS. 2, 3, and 7 and based on a "worst-case" phase), the active mode operations 512, 513 would be optimized (i.e., two or more operating points adjusted/updated based on standby data point aggregation) (e.g., first and second operating points corresponding to respective first and second DVFS modes) such that the active phases 512, 513 can be "stretched" into respective standby phases 514, 515. Hence, as shown in FIG. 5B, upon optimization, in the particular example, the active mode operations 512, 513 may be run at 20 MHz over durations of 0.1 ms and 0ms, respectively.

In FIG. 5, the power management optimization for this particular scenario corresponds to a "worst-case" phase (i.e., the most active phase). Accordingly, to account for such a scenario, systems and methods as described herein may distinguish between different active-phases from an instruction pointer (i.e., program counter) of the CPU and utilize aggregated standby data to reduce frequency (and move lower on an example performance curve; hence, lowering voltage), but yet ensure the one or more software workloads would meet any time deadlines (e.g., a next "wake-up", a subsequent transition into active-phase). Correspondingly, the second DVFS mode, for example, may be configured to set the active-mode operations 512, 513 as substantially equal to an active mode of a code phase having a longest time interval (i.e., "worst case" code phase: that would be analyzed to provide performance that would not violate a shortest standby phase, and thus, optimized for a longest code phase). In certain implementations, parameters to determine whether a decision threshold include, but are not limited to 1) the performance or energy overhead (i.e., cost) of changing the DVFS level, 2) IVR latency, and 3) the size of the task interval.

Thus, advantageously, by monitoring the active and standby times (e.g., recording and aggregating standby data points according to the example procedures 300, 700 as described herein) for repetitive single tasks of multiphases (i.e., multiple software workloads) (e.g., including the steps of "wakeup" at fixed intervals, "grabbing" sensor data readings, performing sanity checks, then storing/aggregating the sensor data readings, occasional burst processing of a "bundle" of accumulated sensor data readings), an opportunity to run a clock operation nearly 50% slower and, thus, reduce active energy by approximately 40% may be realized.

In particular example use cases, the multi-phases (i.e., one or more software workloads) may be, but are not limited to, electrocardiogram (ECG) heart-rate monitors, meeting room people counters, audio keyword spotting, etc. As compared to single-phase, multi-phase may be a more complex case where, for example, a designer/programmer may run in order: 100 wake/sleep samples of 20 k instructions, followed by a single 100 k instruction phase, and subsequently, back to 100 wake/sleep samples of 20 k instructions.

In certain implementations, when a software workload includes the multi-phase workload, an operation would further include the following steps: 1) classifying each of the code phases of the multi-phase workload, where each code phase may correspond to a particular software workload of the multi-phase workload; 2) tracking each of the code phases by recording the standby entry data points and the standby exit data points corresponding to classified software workloads; and determining different operating points on the respective performance curves for each of the tracked code phases.

Figure 6A:
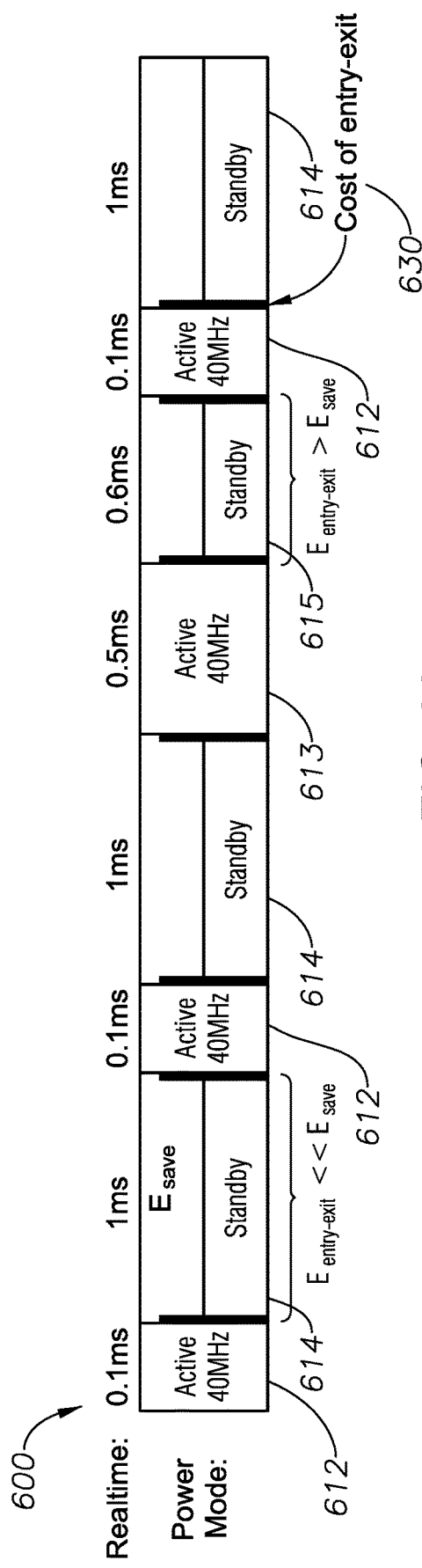
FIGS. 6A-6B illustrate an example diagram in accordance with implementations of various techniques described herein.
Figure 6B:
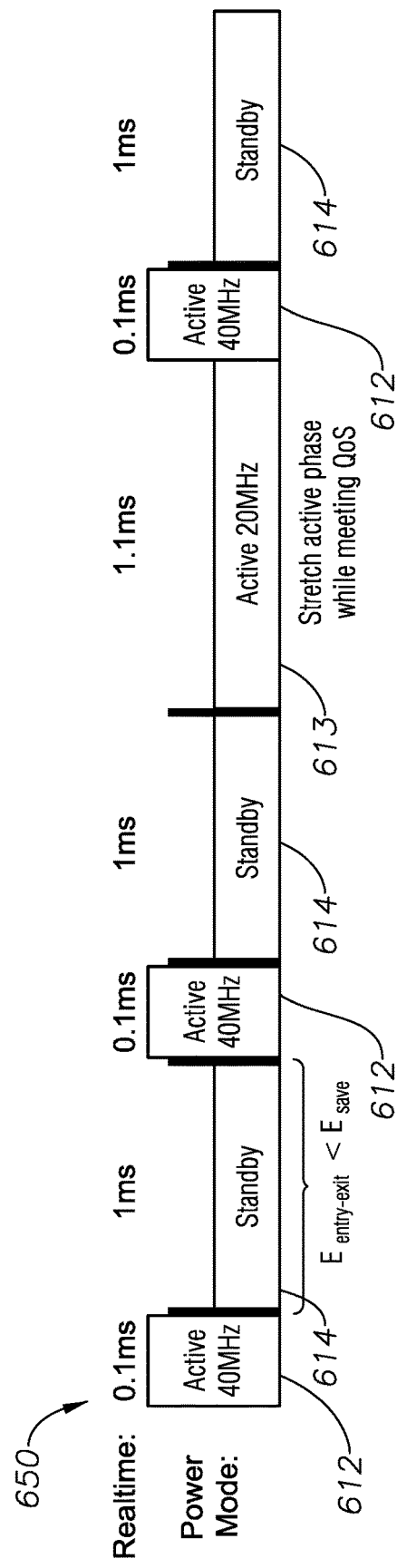

Referring to FIG. 6A-6B, in one example, the two or more different example code phases 510, 511 in FIG. 5A are shown as two or more different example code phases 610, 611 before (600 in FIG. 6A) and after (650 in FIG. 6B) active power management according to the inventive aspects. As illustrated, in FIG. 6A, the power mode (e.g., active-mode operations 612, 613 and standby-mode operations 614, 615) (i.e., the execution of software instructions of two or more software workloads) can be depicted over a period of time (i.e., milliseconds (ms)) for a particular sensing example. The example codes phases 610, 611 may represent repetitive single tasks of multiple phases (i.e., multi-phases) (e.g., two or more software workloads) that transition from active-mode operations 612, 613 to standby mode operations 614, 615 (e.g., low power operations) at different intervals.

Further to FIG. 5A, in FIG. 6A, consideration may also be given to an energy cost 630 associated to entry and exits from standby-mode operations. In certain cases, due to the energy cost 630 (e.g., as result of decoupling capacitance being allowed to collapse and, hence, may require recharging, as well as associated logic glitching during "power-up"), overall energy may be saved only above a certain "break-even" time. As shown in FIG. 6A, at 614, the energy expended from entry and exit of standby-mode operation ($E_{entry-exit}$) is shown to be far less than the energy saved ($E_{save}$) ($E_{entry-exit} \ll E_{save}$). Accordingly, as shown in FIG. 6B, transition to the standby-operation would be performed, as energy savings would be realized. However, as shown in FIG. 6A, at 615, the energy expended from entry and exit of standby-mode operation ($E_{entry-exit}$) is shown to be greater than the energy saved ($E_{save}$) ($E_{entry-exit} > E_{save}$). Hence, as shown in FIG. 6B, upon optimization, the active mode operation of a second code phase 613 may be "stretched" to fully incorporate the particular standby-mode operation between the second code phase 613 and the following instance of the first code phase 612. Advantageously, such an optimization of the active-phase would occur while abiding by quality-of-service (QoS) requirements. Hence, for example, if the optimized standby-operation time (i.e., post-DVFS standby-time) may be predicted to be lower than the break-even time (e.g., $E_{save}$), entering and exiting a standby-operation may not be beneficial, and thus, this overhead (i.e., cost) can be, thus, avoided.

Figure 7:
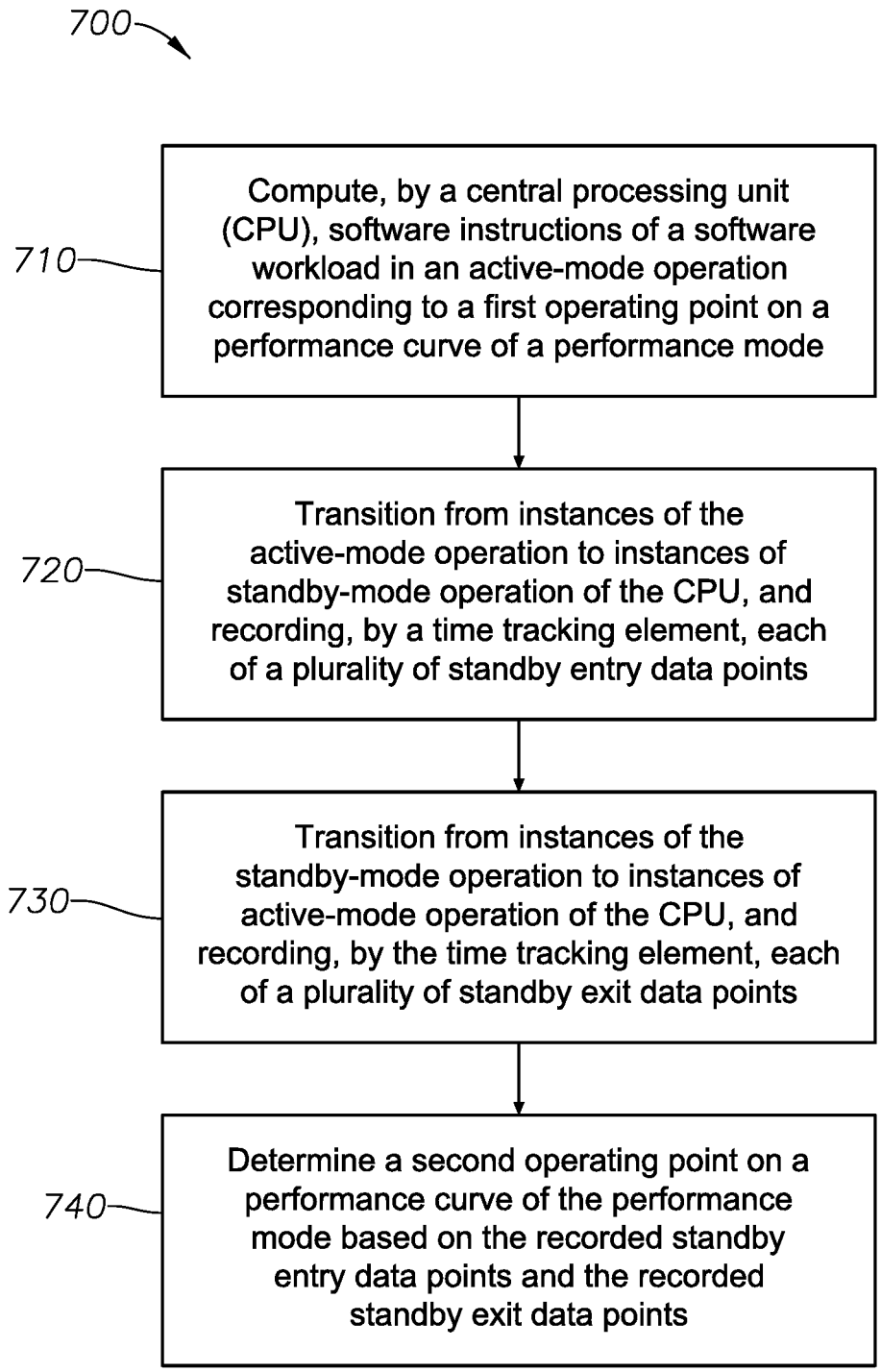
FIG. 7 is a particular illustrative aspect of methods in accordance with implementations of various techniques described herein.

Referring to FIG. 7, a method 700 to automatically optimize a performance mode based on adjusting/updating operating point(s) based on statistics (i.e., standby entry and exit data points, metrics) of its standby mode usage is shown. In certain instances, the method 700 may be utilized for the active power management of microcontrollers.

At block 710, the method 700 includes computing (i.e., executing, initializing), by a computer processing unit (CPU, CPU subsystem), software instructions of a software workload (i.e., sensing tasks) in an active-mode (i.e., active power mode) operation corresponding to a first operating point of a performance mode (e.g., a DVFS mode based on a predetermined or predefined first operating point on a DVFS curve (i.e., DVFS spectrum) of an embedded microcontroller unit (MCU)). For instance, with reference to various implementations as described in FIGS. 1-6, the CPU 210 would execute a software workload that corresponds to a first operating point of the plurality of operating points 132 of a particular performance mode (e.g., a DVFS mode).

At block 720, the method 700 includes transitioning from instances of the active-mode operation to instances of standby-mode operation (i.e., low power mode) of the CPU, and recording (i.e., sampling, "tracking/grabbing" sensor data readings, detailing, logging), by a time tracking element (e.g., a programmable real-time clock (RTC) alarm), each of a plurality of standby entry data points (i.e., metrics, stats). For instance, in various implementations as described with reference to FIGS. 1-6, the PMU 220 may be configured to sequence the CPU 210 into a standby-mode operation from an active-mode operation, and vice-versa. Further, the time tracking element 230 may be configured to sample standby entry data points.

At block 730, the method includes transitioning from the instances of the standby-mode operation to the instances of the active-mode operation (e.g., future "wake-ups") of the CPU, and recording (i.e., sampling, "tracking/grabbing" sensor data readings, detailing, logging), by the time tracking element, each of a plurality of standby exit data points (i.e., metrics, stats). For instance, in various implementations as described with reference to FIGS. 1-6, the PMU 220 may be configured to wake up the CPU 210 into active-mode operation from standby-mode operation, and vice-versa. Further, the time tracking element 230 may be configured to sample standby exit data points.

At block 740, the method includes determining a second operating point of the performance mode based on the recorded standby entry data points and the recorded standby exit data points. For instance, in various implementations as described with reference to FIGS. 1-6, the PMU 220 may be configured to provide an updated ("optimized") operating point (e.g., the "highest" DVFS operating point).

In an example implementation, the method includes determining the second operating point on the performance curve of the performance mode based on at least a portion of a plurality of standby entry data points and at least a portion of a plurality of standby exit data points, where the plurality of standby entry data points correspond to the transitions from the active-mode operation to the standby-mode operation, and where the plurality of standby exit data points correspond to the transitions from the standby-mode operation to the active-mode operation. For instance, in various implementations as described with reference to FIGS. 1-6, the PMU 220 may be configured to sequence the CPU 210 into a standby-mode operation from an active-mode operation, and vice-versa. Further, the time tracking element 230 may be configured to sample standby entry data points and standby exit data points that correspond to respective transitions from active-mode operation to standby-mode operation, and vice-versa.

In an additional illustrative aspect, the method includes enacting the performance mode based on the second operating point, where enacting the performance mode includes providing, by a PMU, an operating voltage and a clock signal to the CPU. For instance, with reference to FIGS. 1-6, a performance mode may be enacted (e.g., at step 360, setting an optimal DVFS mode) by providing (i.e., control a voltage source to supply) (by the PMU 220) an operating voltage (i.e., a "higher" or "lower" voltage (e.g., VDD in FIG. 2)) and a clock signal (e.g., Clock in FIG. 2) to the CPU 210.

In additional illustrative aspects, determining the second operating point may include one or more of: 1) evaluating the recorded standby entry data points and recorded standby exit data points based on standby periodicity and standby regularity; 2) determining a cost (i.e., "performance or energy overhead" of changing an operating point (e.g., as described with reference to FIGS. 6A-6B)), 3) determining a power supply latency (i.e., direct current-to-direct current converter (DC-DC converter) (e.g., integrated voltage regulator (IVR) latency); 4) determining time intervals of the software workload (i.e., a "size" of the task interval), and/or 5) determining time intervals of transitions from the active-mode operation to the standby-mode operation, and vice-versa.

In additional illustrative aspects, evaluating the recorded standby entry data points and recorded standby exit data points (i.e., recorded statistics, recorded metrics) may include computing a duty cycle and a minimum time interval for the standby-mode operation, where the duty cycle would correspond to a quotient of a weighted active time interval and a weighted standby time interval of the particular software workload.

In some implementations, an earlier computation result (e.g., as associated with a prior operating point) may be required by the inventive operation even while sacrificing efficiency. Advantageously, in such cases, the operation (through software) may set an override bit to disable automatic adjustment of performance. In doing so, the operation would also be configured to disable both associated active-mode and standby-mode recording (e.g., profiling, monitoring) so as to not "pollute" statistic gathering (e.g., data point aggregation) during other code phases. Advantageously, such implementations may be useful in radio-frequency identification (RFID) sensor networks, where solely one tag may be currently active, and the RFID reader may desire to shut off earlier to save on 1 to 2 watts of radio frequency (RF) transmission power.

According to particular schemes and techniques, various implementations may be enacted in either hardware or software. In one example, a particular hardware implementation would include an "always-on" power controller (e.g., including a processor and memory) to sample and store data values (i.e., data points, metrics) in instances where the power controller "actions" (e.g., initiates, schedules) power-mode change requests (e.g., standby entry on wait-for-interrupt (WFI) and "wake-up" on either internal or external interrupt). Upon doing so, the power controller may then determine an optimization (i.e., an adjustment of an operating point of a performance mode based on statistics of standby-mode usage) and enact the optimization. In another example, a computer-implemented software implementation may include a memory accessible to the processor, where the memory can store instructions that are executable by the CPU to perform operations. The operations would include: providing for a time tracking element (e.g., a standby tracking device) to sample standby time values (e.g., standby time intervals) of a software workload upon power-mode changes (e.g., change requests); and storing the sampled standby time values (i.e., resulting data) into a programmable memory (e.g., a NVM or retentive SRAM).

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. For example, memory and/or storage device(s) of either the CPU 210 or the PMU 220 in the system 200, may include tangible, non-transitory computer-readable media or storage devices.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The term "processor" is used, generally, herein to refer to a microprocessor or processing apparatus integrated in a single integrated circuit, or chip, and that systematically performs operation in a preset order under control of software code. The term "system on a chip" (SOC) is used, generally, herein to refer to a processing apparatus that integrates various functional blocks (e.g., a central processing unit (CPU), a memory, an interface unit, a digital signal processing circuit, an analog signal processing circuit, etc.) in a single, or few, semiconductor integrated circuits (ICs) to realize an electronic system, such as a computer system, using a limited number of integrated circuits. An SOC may include various functions, such as a processor function, a multimedia function, a graphic function, an interface function, and a security function, for example.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of power management comprising:
computing, by a central processing unit (CPU), software instructions of a software workload in an active-mode operation corresponding to a first operating point on a performance curve of a performance mode;
transitioning from instances of the active-mode operation to instances of standby-mode operation of the CPU;
transitioning from the instances of the standby-mode operation to the instances of the active-mode operation of the CPU; and
determining a second operating point on the performance curve of the performance mode based on a first and second of a plurality of standby entry data points and a first and second of a plurality of standby exit data points, wherein:
the first standby exit data point is sequential with the first standby entry data point,
the second standby exit point is sequential with the second entry data point,
the plurality of standby entry data points corresponds to the transitions from the active mode operation to the standby-mode operation,
the plurality of standby exit data points corresponds to the transitions from the standby-mode operation to the active-mode operation, and
the difference between the first standby exit data point and the first standby entry data point is different from the difference between the second standby exit data point and the second standby entry data point.

2. The method of claim 1, further comprising:
enacting the performance mode based on the second operating point, wherein enacting the performance mode comprises providing, by a power management unit (PMU), an operating voltage and a clock signal to the CPU, and wherein the performance mode corresponds to either a dynamic voltage frequency scaling (DVFS) mode or a body-biasing for frequency scaling at ISO-voltage mode.

3. The method of claim 1, wherein the transitions to the standby-mode operation are performed in response to one of: a sleep-mode of the CPU or a wait-for-interrupt (WFI) instruction, and wherein the transitions to the active-mode operation are performed in response to one of: active-mode operation requests of the CPU, activations of an alarm of the time tracking element, internal interrupt instructions, or external interrupt instructions.

4. The method of claim 1, further comprising:
recording at least a portion of the plurality of the standby entry data points and recording at least a portion of the plurality of the standby exit data points into a programmable memory of the CPU or the PMU.

5. The method of claim 1, wherein determining the second operating point comprises one or more of:
evaluating at least a portion of the plurality of the standby entry data points and at least a portion of the plurality of the standby exit data points;
determining a cost of changing the first operating point;
determining a power supply latency,
determining time intervals of the software workload, and
determining time intervals of transitions from the active-mode operation to the standby-mode operation and the standby-mode operation to the active-mode operation.

6. The method of claim 5, wherein evaluating at least the portion of the plurality of the standby entry data points and at least the portion of the plurality of the standby exit data points comprise:
computing a duty cycle and a minimum time interval for the standby-mode operation, wherein the duty cycle corresponds to a quotient of a weighted active time interval and a weighted standby time interval of the software workload.

7. The method of 1, wherein the second operating point corresponds to a decrease from the first operating point on the performance mode curve of a performance operating map, and wherein the decrease corresponds to a shortening of the active phase operation.

8. The method of claim 1, wherein the software workload comprises either a single-phase or a multi-phase workload.

9. The method of claim 8, wherein if the software workload comprises the multi-phase workload, the second operating point corresponds to a second DVFS mode that is configured to set the active-mode operation as substantially equal to an active mode of a code phase having a longest time interval.

10. The method of claim 8, wherein if the software workload comprises the multi-phase workload, further comprising:
classifying one or more code phases of the multi-phase workload, wherein each code phase of the one or more code phases corresponds to a particular software workload of the multi-phase workload;
tracking one or more code phases by recording the standby entry data points and the standby exit data points corresponding to respective classified software workloads; and
determining different operating points on respective performance curves for each of the tracked code phases.

11. The method of claim 1, wherein a time tracking element is configured to track the transitions from the active-mode operation to the standby-mode operation, and the transitions from the standby-mode operation to the active-mode operation, and wherein the time tracking element comprises one of a real-time clock (RTC), voltage measurement device, resistor-capacitor (RC) time-constants, and a leakage measurement.

12. A system comprising:
a central processing unit (CPU);
a power management unit (PMU) coupled to the CPU; and
a time tracking element coupled to the CPU and the PMU, wherein:
the PMU is configured to control the time tracking element to record sequential standby entry and exit data points of one or more code phases of a software workload, and
the CPU is configured to determine an operating point on a performance curve based on a first and second of the standby data entry points and a first and second of the standby exit data points, wherein:
the first standby exit data point is sequential with the first standby entry data point,
the second standby exit point is sequential with the second entry data point,
the standby entry data points corresponds to the transitions from an active-mode operation to a standby-mode operation,
the standby exit data points corresponds to the transitions from the standby mode operation to the active-mode operation, and the difference between the first standby exit data point and the first standby entry data point is different from the difference between second standby exit data point and the second standby entry data point.

13. The system of claim 12, wherein the PMU is configured to: sequence the CPU into instances of standby mode operation upon notification that the CPU is in a low power state, initiate active-mode operation of the CPU when the time tracking element is activated, and initialize software instructions of the software workload.

14. The system of claim 12, wherein the CPU is configured to evaluate the recorded standby entry and exit data points based on standby periodicity and standby regularity.

15. The system of claim 12, wherein an alarm triggered by the time tracking element is configured to provide subsequent initiations of active mode operation of the CPU.

16. The system of claim 12, wherein the PMU is configured to provide an operating voltage and a clock signal to enact a second operating point.

17. The system of claim 12, wherein the performance curve corresponds to a dynamic voltage frequency scaling (DVFS) curve or a body-biasing for frequency scaling at ISO-voltage curve.

18. A method comprising:
sampling, by a microcontroller device of a power management unit (PMU), sequential standby time values of a software workload upon power-mode changes, wherein the sequential standby time values correspond to at least a first and second of a plurality of standby entry data points and a first and second of a plurality of standby exit data points; and
determining a performance mode corresponding to a particular operating point on a performance curve based on the sampled sequential standby values, wherein:
the first standby exit data point is sequential with the first standby entry data point,
the second standby exit point is sequential with the second entry data point,
the plurality of standby entry data points corresponds to the transitions from an active-mode operation to a standby-mode operation,
the plurality of standby exit data points corresponds to the transitions from the standby-mode operation to the active-mode operation, and
the difference between the first standby exit data point and the first standby entry data point is different from the difference between second standby exit data point and the second standby entry data point.

19. The method of claim 18, further comprising:
enacting the performance mode, wherein enacting the performance mode comprises providing, by the PMU, an operating voltage and a clock signal to the CPU.

20. The method of claim 18, wherein determining the performance mode is based on one or more of: evaluating the recorded standby entry data points and recorded standby exit data points, and wherein evaluating the recorded standby entry data points and recorded standby exit data points comprises:
computing a duty cycle and a minimum time interval for the standby-mode operation, wherein the duty cycle corresponds to a quotient of a weighted active time interval and a weighted standby time interval of the software workload.

21. The method of claim 18, further comprising:
receiving, from the CPU, software instructions indicating that the CPU is in a sleep-mode;
sequencing the CPU into a standby-mode operation; and
initiating an active-mode operation of the CPU upon an alarm activation of a time tracking element.

22. A computer system comprising:
a computer processor unit (CPU); and
a memory accessible to the CPU, the memory storing instructions that are executable by the CPU to perform operations comprising:
providing for a time tracking element to sample sequential standby time values of a software workload upon power-mode changes, wherein the sequential standby time values correspond to at least a first and second of a plurality of standby entry data points and a first and second of a plurality of standby exit data points;
storing the sampled sequential standby time values into a programmable memory; and
modifying subsequent sequential standby time values based on the stored sequential standby time values, wherein:
the first standby exit data point is sequential with the first standby entry data point,
the second standby exit point is sequential with the second entry data point,
the plurality of standby entry data points corresponds to the transitions from an active-mode operation to a standby-mode operation,
the plurality of standby exit data points corresponds to the transitions from the standby-mode operation to the active-mode operation, and
the difference between the first standby exit data point and the first standby entry data point is different from the difference between second standby exit data point and the second standby entry data point.

23. The computer system of claim 22, wherein the operations further comprise:
determining a performance mode corresponding to a particular operating point on a performance curve based on the stored standby values.

24. The computer system of claim 23, wherein the operations further comprise:
enacting the performance mode, wherein enacting the performance mode comprises instructing a power management unit (PMU) to provide an operating voltage and a clock signal to the CPU.

* * * * *